United States Patent
Liu et al.

(10) Patent No.: US 9,292,120 B2
(45) Date of Patent: Mar. 22, 2016

(54) ELECTRONIC DEVICE AND OPERATION METHOD THEREOF

(75) Inventors: You-Chi Liu, Taipei (TW); Shi-Kuan Chen, Taipei (TW); Hong-Tien Wang, Taipei (TW); Po-Hsien Yang, Taipei (TW)

(73) Assignee: COMPAL ELECTRONICS, INC., Taipei (TW)

( * ) Notice: Subject to any disclaimer, the term of this patent is extended or adjusted under 35 U.S.C. 154(b) by 1121 days.

(21) Appl. No.: 13/117,168

(22) Filed: May 27, 2011

(65) Prior Publication Data

US 2011/0291970 A1 Dec. 1, 2011

Related U.S. Application Data

(60) Provisional application No. 61/349,222, filed on May 28, 2010.

(51) Int. Cl.
*G06F 3/041* (2006.01)
*G06F 3/0488* (2013.01)

(52) U.S. Cl.
CPC ............ *G06F 3/0416* (2013.01); *G06F 3/0488* (2013.01); *G06F 3/04886* (2013.01)

(58) Field of Classification Search
CPC ... G06F 3/048; G06F 3/0488; G06F 3/04886; G06F 2203/04806; G06F 3/0482; G06F 3/04883; G06F 3/04808; G06F 3/0416
USPC .................................................. 345/156–184
See application file for complete search history.

(56) References Cited

U.S. PATENT DOCUMENTS

| 7,564,448 | B2 | 7/2009 | Yi | |
|---|---|---|---|---|
| 7,710,390 | B2 * | 5/2010 | Tokkonen | 345/156 |
| 2008/0119237 | A1 * | 5/2008 | Kim | 455/566 |
| 2009/0184935 | A1 * | 7/2009 | Kim | 345/173 |
| 2010/0001967 | A1 * | 1/2010 | Yoo | 345/173 |
| 2011/0169749 | A1 * | 7/2011 | Ganey et al. | 345/173 |

FOREIGN PATENT DOCUMENTS

| CN | 101183292 | 5/2008 |
|---|---|---|
| JP | 2007028512 | 2/2007 |

(Continued)

OTHER PUBLICATIONS

"Office Action of Taiwan Counterpart Application", issued on Mar. 7, 2014, p. 1-p. 16.

(Continued)

*Primary Examiner* — Aneeta Yodichkas
*Assistant Examiner* — Saifeldin Elnafia
(74) *Attorney, Agent, or Firm* — Jianq Chyun IP Office

(57) ABSTRACT

An electronic device including a touch display panel, a panel touch control unit, and an image adjustment unit is provided. The panel touch control unit is electronically connected to the touch display panel. The image adjustment unit is electronically connected to the touch display panel. In operation, the touch display panel has a content display region and a touch menu region with adjustable sizes. The panel touch control unit adjusts the size of the touch menu region according to a received touch signal. The touch display panel contacts an object to be pressed and generates a touch signal according to a contact area. The image adjustment unit adjusts the size of the content display region according to an adjustment signal generated by the panel touch control unit.

40 Claims, 10 Drawing Sheets

(56) References Cited

FOREIGN PATENT DOCUMENTS

| | | |
|---|---|---|
| TW | 200921472 | 5/2009 |
| TW | 201017487 | 5/2010 |

OTHER PUBLICATIONS

"Office Action of Japan Counterpart Application", issued on Feb. 26, 2013, p. 1-p. 2.

* cited by examiner

ELECTRONIC DEVICE AND OPERATION METHOD THEREOF

CROSS-REFERENCE TO RELATED APPLICATION

This application claims the priority benefits of U.S. provisional application Ser. No. 61/349,222, filed on May 28, 2010. The entirety of the above-mentioned patent applications is hereby incorporated by reference herein and made a part of this specification.

BACKGROUND OF THE INVENTION

1. Field of the Invention

The invention generally relates to an electronic device and an operation method thereof, and more particularly, to an electronic device having a touch display panel and an operation method thereof.

2. Description of Related Art

The design of electronic devices has been going towards light weight and slim appearance. As a result, the volume of an electronic device is limited. If both a screen and a keyboard are disposed on an electronic device, the size of the screen has to be reduced. Touch display panels have been broadly applied to various electronic devices in order to dispose larger screens within limited space. This is because a touch display panel offers both input and display functions such that the cost and space for disposing a conventional keyboard can be saved.

However, a touch display panel is very sensitive to an external touch operation. A functional option on a touch display panel may be started even when a user accidentally touches the touch display panel. In particular, a user usually holds an electronic device with both hands while browsing images displayed on the touch display panel. In order to avoid touching the functional options on the touch display panel, the user has to poise his/her thumbs above or at two sides of the touch display panel. However, because one usually holds an object with the thumb and the other four fingers of each hand, aforementioned gesture will make the operation of the user very uncomfortable.

In other words, while holding an electronic device, the fingers (especially the thumbs) of the user may easily touch a functional option on the touch display panel, and accordingly the electronic device may execute an undesired control command.

SUMMARY OF THE INVENTION

Accordingly, the invention is directed to an electronic device, wherein whether a control command corresponding to a touch signal is executed is determined by a panel touch control unit, so that when a user holds the electronic device, a content display region of the electronic device won't be blocked by the user's hand.

The invention is directed to an operation method of an electronic device, wherein whether a control command corresponding to a touch signal is executed is determined according to the lasting time of the touch signal or a contact area on the touch display panel pressed by a user, so that the electronic device can selectively execute the control command.

The invention provides an electronic device including a touch display panel, a panel touch control unit, and an image adjustment unit. The touch display panel has a content display region and a touch menu region with different sizes. The panel touch control unit is connected to the touch display panel. The panel touch control unit generates a first adjustment signal according to a received first touch signal and adjusts the size of the touch menu region on the touch display panel. The image adjustment unit adjusts the size of the content display region according to the first adjustment signal generated by the panel touch control unit on the touch display panel.

According to an embodiment of the invention, the touch display panel is a multi-touch display panel.

According to an embodiment of the invention, the panel touch control unit generates a second adjustment signal according to a received second touch signal and adjusts the size of the touch menu region according to the second adjustment signal on the touch display panel, and the image adjustment unit adjusts the size of the content display region according to the second adjustment signal on the touch display panel.

According to an embodiment of the invention, when the panel touch control unit receives both the first touch signal and the second touch signal, the panel touch control unit adjusts the size of the touch menu region according to the first adjustment signal and the second adjustment signal, on the touch display panel and the image adjustment unit adjusts the size of the content display region according to the first adjustment signal and the second adjustment signal on the touch display panel.

According to an embodiment of the invention, the size of the adjusted content display region according to the first adjustment signal and the second adjustment signal is an overlapped area or a partially overlapped area between the size of the adjusted content display region according to the first adjustment signal and the size of the adjusted content display region according to the second adjustment signal.

According to an embodiment of the invention, the size of the adjusted touch menu region according to the first adjustment signal and the second adjustment signal is an overlapped area or a partially overlapped area between the size of the adjusted touch menu region according to the first adjustment signal and the size of the adjusted touch menu region according to the second adjustment signal.

According to an embodiment of the invention, the touch display panel includes a display unit and a touch unit, the display unit displays an image, and the touch unit generates a touch signal.

According to an embodiment of the invention, the panel touch control unit includes a panel touch controller, the panel touch controller adjusts the size of the touch menu region according to a touch signal, and the first adjustment signal contains information of the touch signal.

According to an embodiment of the invention, the panel touch control unit further includes a timer, and the timer calculates a lasting time of the touch signal, wherein when the lasting time of the touch signal is greater than a predetermined value, the panel touch control unit sends an adjustment signal, and when the lasting time of the touch signal is smaller than the predetermined value, the panel touch control unit executes a control command corresponding to the touch signal.

According to an embodiment of the invention, the panel touch control unit further includes an area calculation module, and the area calculation module calculates a contact area produced by the touch signal within the touch menu region, wherein when the contact area is greater than a predetermined value, the panel touch control unit sends the adjustment signal, and when the contact area is smaller than the predetermined value, the panel touch control unit executes a control command corresponding to the touch signal.

According to an embodiment of the invention, the image adjustment unit calculates a first distance, a second distance, a third distance, and a fourth distance from the touch signal to the touch display panel by using a rectangular coordinates, sets two greater ones of the first distance, the second distance, the third distance, and the fourth distance as a first variation and a second variation, and adjusts the size of the content display region by using the first variation and the second variation.

According to an embodiment of the invention, the image adjustment unit includes a processor and a display card.

According to an embodiment of the invention, the panel touch control unit further includes a storage unit.

According to an embodiment of the invention, the electronic device further includes a lock key and an input controller. When the lock key is pressed, the lock key generates an input signal. The input controller is electrically connected to the lock key and the image adjustment unit. The input controller generates a locking signal according to the input signal, and the image adjustment unit locks the range of the content display region according to the locking signal.

According to an embodiment of the invention, the panel touch control unit and the image adjustment unit further generate a drag list within the content display region.

According to an embodiment of the invention, the content display region and the touch menu region do not overlap each other or partially overlap each other.

According to an embodiment of the invention, data of the content display region located within an overlapped portion between the touch menu region and the content display region presents a transparent or semi-transparent pattern.

According to an embodiment of the invention, touch signals of the touch menu region generated within an overlapped portion and a non-overlapped portion between the touch menu region and the content display region are simultaneously processed.

According to an embodiment of the invention, the image adjustment unit further presents a control menu within a non-overlapped area between the content display region and the touch menu region, and the control menu is within the touch menu region.

According to an embodiment of the invention, the control menu comprises a plurality of keys or a drag list.

According to an embodiment of the invention, the control menu presents a transparent or semi-transparent pattern.

According to an embodiment of the invention, the content display region and the touch menu region simultaneously process the adjustment signal.

According to an embodiment of the invention, the content display region is a visible area of a data display region, and the touch menu region is an area on the touch display panel which is touched to control the electronic device.

According to an embodiment of the invention, the resolution of the adjusted content display region changes or does not change. According to an embodiment of the invention, when the resolution of the content display region does not change, the position of the content display region on the electronic device changes.

The invention provides an operation method of an electronic device. The electronic device having a touch display panel that includes an adjustable content display region and an adjustable touch menu region. The operation method includes following steps. A touch signal is generated by a touch behavior The touch signal is received and an adjustment signal is generated and sent according to the touch signal by using a panel touch control unit according to the touch signal. The size of the content display region is adjusted according to the adjustment signal by using an image adjustment unit, and the size of the touch menu region is adjusted according to the adjustment signal by using the panel touch control unit.

As described above, in the invention, whether a control command corresponding to a touch signal is executed is determined according to the lasting time of the touch signal or a contact area on the touch display panel pressed by a user. Additionally, in the invention, when the control command corresponding to the touch signal is not executed, a plurality of adjustment parameters is further generated according to the coordinates of the touch signal, so as to adjust the ranges of a content display region and a touch menu region on the touch display panel. Thereby, the electronic device can selectively execute a control command corresponding to a touch signal. In other words, the electronic device does not execute the control command but adjusts the ranges of the content display region and the touch menu region on the touch display panel when the user is not working with the functional options on the touch display panel.

These and other exemplary embodiments, features, aspects, and advantages of the invention will be described and become more apparent from the detailed description of exemplary embodiments when read in conjunction with accompanying drawings.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DESCRIPTION OF THE EMBODIMENTS

Figure 1:
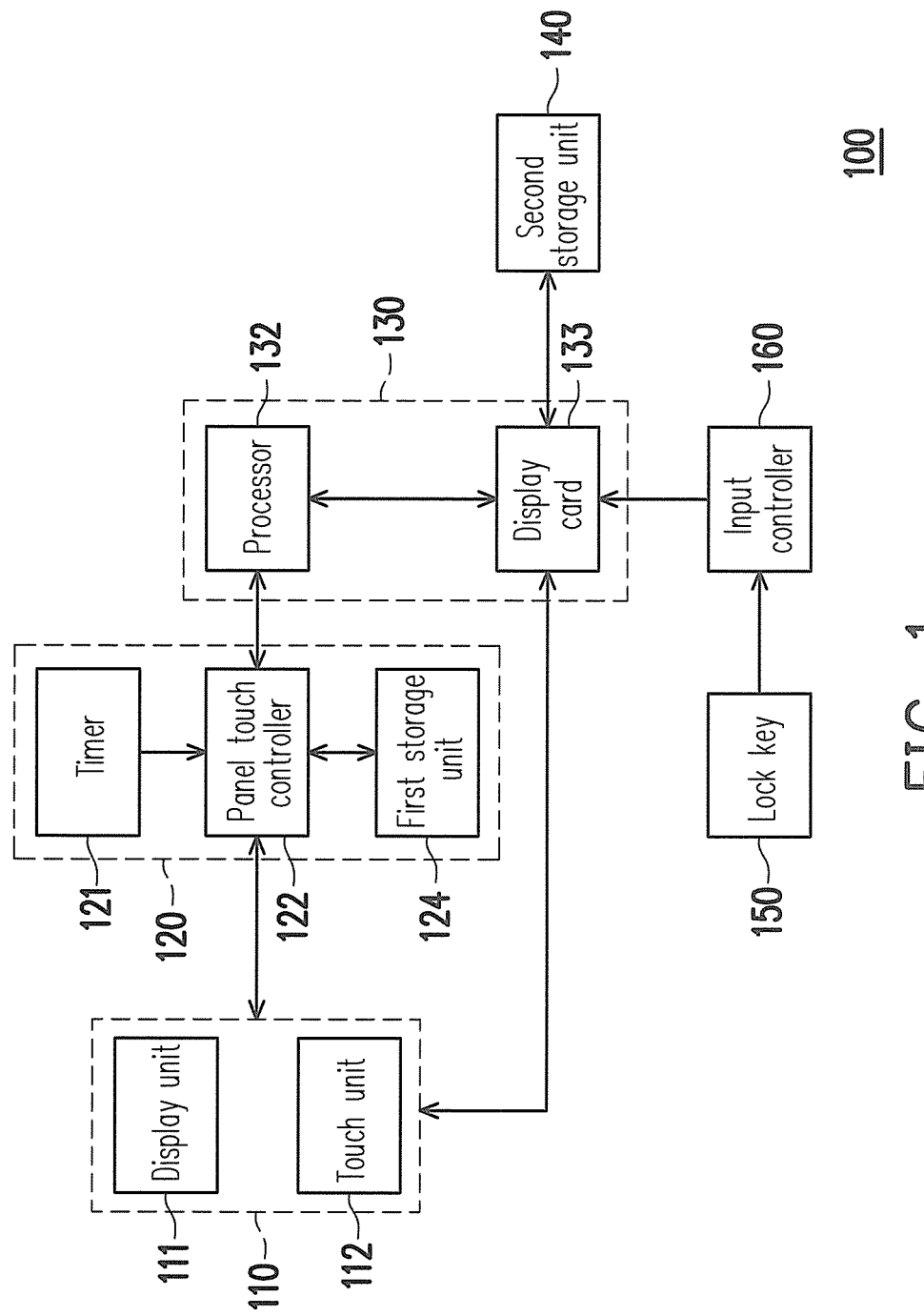
FIG. 1 is a block diagram of an electronic device according to an embodiment of the invention.

Reference will now be made in detail to the present preferred embodiments of the invention, examples of which are illustrated in the accompanying drawings. Wherever possible, the same reference numbers are used in the drawings and the description to refer to the same or like parts.

FIG. 1 is a block diagram of an electronic device according to an embodiment of the invention. Referring to FIG. 1, the electronic device 100 includes a touch display panel 110, a panel touch control unit 120, and an image adjustment unit 130. The touch display panel 110 may be a multi-touch display panel. The panel touch control unit 120 is electrically connected to the touch display panel 110. The image adjustment unit 130 is electrically connected to the touch display panel 110.

In operation, the touch display panel 110 has a content display region and a touch menu region with different sizes, wherein the content display region is a visible area of a data display region, and the touch menu region is an area on the touch display panel 110 which is touched to control the electronic device 100. The panel touch control unit 120 is connected to the touch display panel 110 and adjusts the size of the touch menu region according to a received touch signal. The touch display panel 110 contacts an object to be pressed and generates the touch signal according to the pressed contact area, wherein the object may be a user's hand, and the touch signal contains the coordinates of the contact area. The image adjustment unit 130 adjusts the size of the content display region according to an adjustment signal generated by the panel touch control unit 120.

To use the electronic device 100, the user usually holds the electronic device 100 with his/her left and right hands. The user may place his/her thumbs on the touch display panel 110 for a long time. As a result, the electronic device 100 may execute an undesired control command or the content display region of the touch display panel 110 may be obstructed. In order to avoid such situations, the panel touch control unit 120 determines whether to send the adjustment signal, so as to allow the image adjustment unit 130 and the panel touch control unit 120 to adjust the sizes of the content display region and the touch menu region on the touch display panel, according to a comparison result between the status value of the touch signal and a first predetermined value, wherein the status value of the touch signal may be the lasting time of the touch signal or the contact area.

When the panel touch control unit 120 sends the adjustment signal, the system does not execute the control command corresponding to the touch signal. Thereby, when the user presses the touch display panel 110 for a long time or produces a very large contact area on the touch display panel 110, it is determined that the user is not working with any functional option on the touch display panel 110. Accordingly, the processor 132 in the electronic device 100 does not execute the control command corresponding to the touch signal and adjusts the sizes of the content display region and the touch menu region at the same time through the image adjustment unit 130 and the panel touch control unit 120, wherein adjusting the sizes of the content display region and the touch menu region includes adjusting the sizes or positions of the content display region and the touch menu region. The panel touch control unit 120 includes a first storage unit 124, and the first storage unit 124 is connected to a panel touch controller 122 for storing the first predetermined value. Herein the first storage unit 124 may be a flash memory.

After the panel touch control unit 120 generates and sends the adjustment signal, the image adjustment unit 130 generates a plurality of adjustment parameters according to the coordinates of the touch signal. Besides, the image adjustment unit 130 adjusts the size of the content display region on the touch display panel 110 according to the adjustment parameters. With different product design, when the image adjustment unit 130 adjusts the size of the content display region, the panel touch control unit 120 may also adjust the size of the touch menu region by using the adjustment parameters at the same time. In other words, when the panel touch control unit 120 determines that the user is not working with any functional option on the touch display panel 110, the image adjustment unit 130 receives the adjustment signal and adjusts the size of the content display region on the touch display panel 110, and the panel touch control unit 120 adjusts the size of the touch menu region according to the adjustment parameters of the adjusted content display region at the same time. Thereby, while browsing an image, the electronic device 100 does not leave the browsed image even if the user puts his/her fingers on the touch display panel 110 in order to hold the electronic device 100 more comfortably. Instead, the electronic device 100 adjusts the size of the content display region correspondingly.

After the touch signal disappears for some time, the image adjustment unit 130 restores the content display region on the touch display panel 110 to its original size. When the touch signal changes, the content display region and the touch menu region on the touch display panel 110 change according to the new touch signal. After the content display region and the touch menu region are adjusted, the content display region and the touch menu region may partially overlap each other or not overlap each other. The image adjustment unit 130 presents a control menu within the part of the touch menu region that is not overlapped with the content display region such that the user can control content in the content display region, wherein the control menu may be a drag list or a plurality of keys, and the control menu may present a transparent or semi-transparent pattern.

Data in the content display region located in the overlapped portion between the touch menu region and the content display region presents a transparent or semi-transparent pattern so that it is made more interesting when the user views the content display region, wherein the data in the transparent or semi-transparent pattern may be virtual keys within the content display region. Because the touch display panel 110 may be a multi-touch display panel, touch signals in the touch menu region generated within the overlapped portion and the non-overlapped portion between the touch menu region and the content display region can be processed at the same time. With different product design, when the panel touch control unit sends an adjustment signal and the image adjustment unit receives the adjustment signal, the panel touch control unit and the image adjustment unit process the adjustment signal at the same time to adjust the sizes of the touch menu region and the content display region.

Figure 2A:
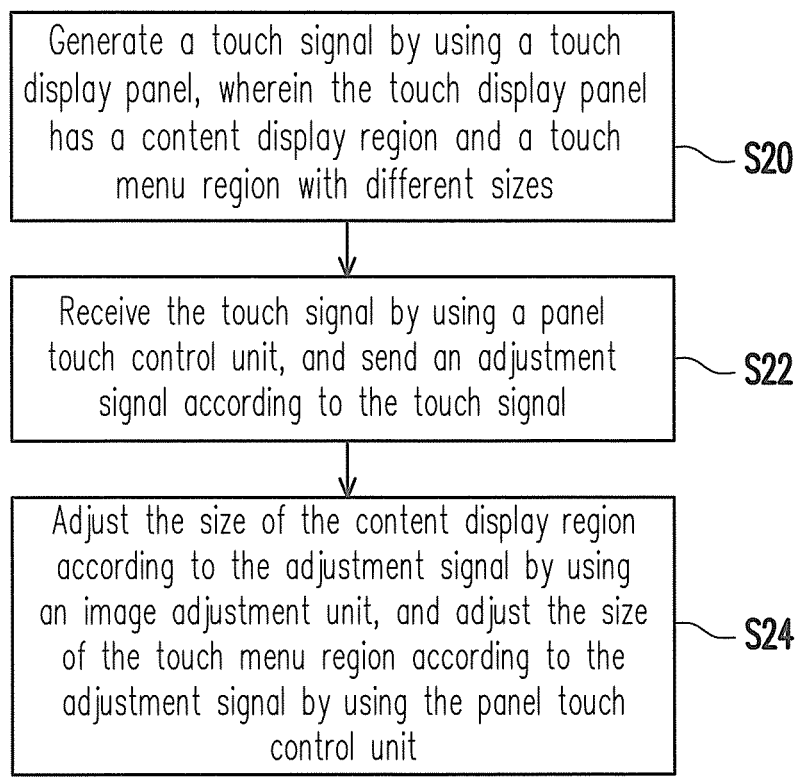
FIG. 2A is a flowchart of an operation method of an electronic device according to an embodiment of the invention.
Figure 2B:
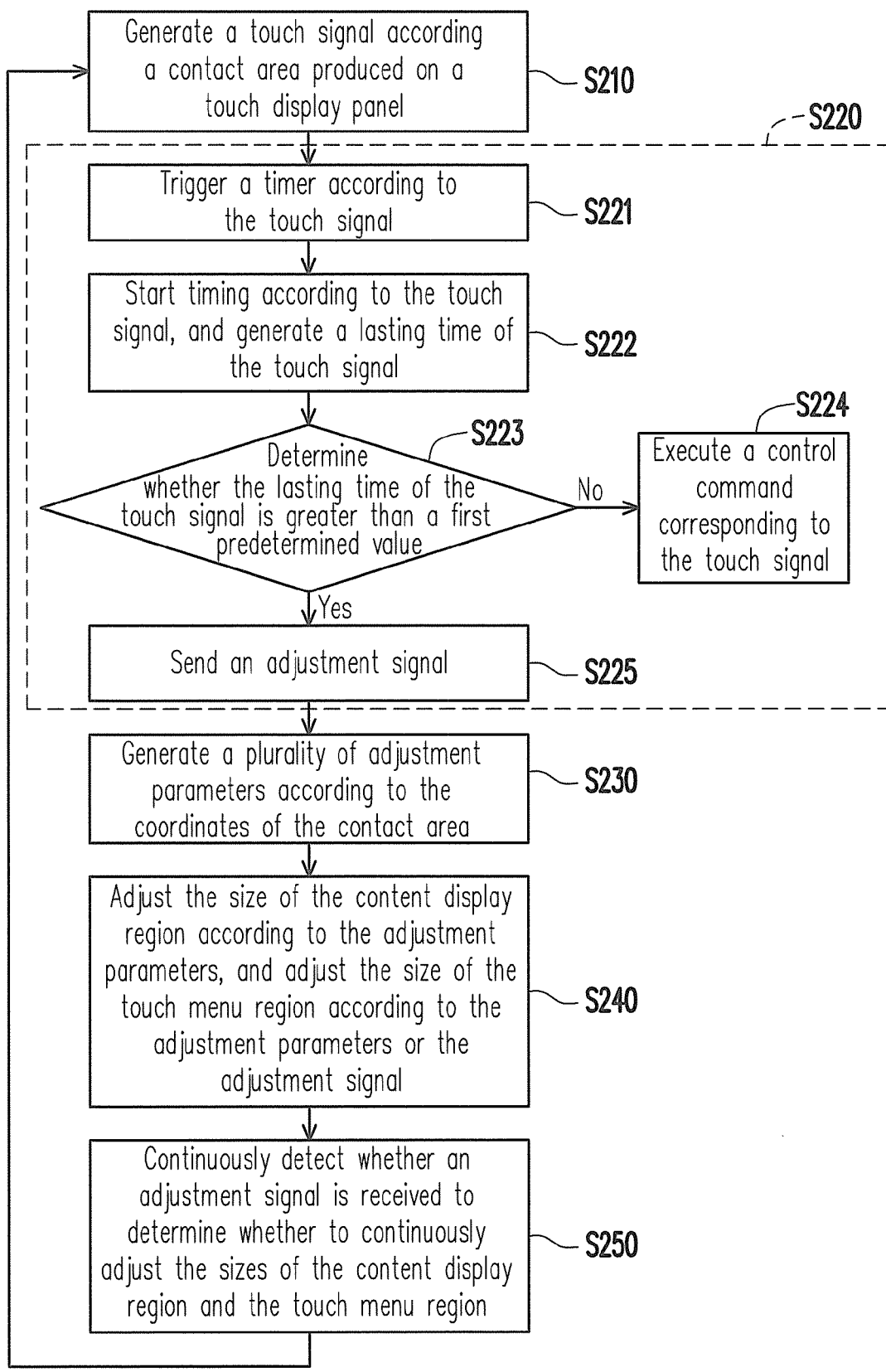
FIG. 2B is a flowchart of an operation method of an electronic device according to an embodiment of the invention.

FIG. 2A is a flowchart of an operation method of an electronic device according to an embodiment of the invention. Referring to FIG. 2A, first, the touch display panel generates a touch signal (step S20), wherein the touch display panel has a content display region and a touch menu region with different and adjustable sizes and the touch signal is generated by a touch behavior. Then, the panel touch control unit receives the touch signal and generates and sends an adjustment signal according to the touch signal (step S22). Eventually, the image adjustment unit adjusts the size of the content display region according to the adjustment signal, and the panel touch control unit adjusts the size of the touch menu region according to the adjustment signal (step S24). In order to allow those having ordinary knowledge in the art to well understand the present embodiment, various components of the electronic device 100 will be further explained with reference to FIG. 1 and FIG. 2B. FIG. 2B is a flowchart of an operation method of an electronic device according to an embodiment of the invention.

Regarding the components of the electronic device 100, the touch display panel 110 includes a display unit 111 and a touch unit 112. The panel touch control unit 120 includes a timer 121 and a panel touch controller 122. The image adjustment unit 130 includes a processor 132 and a display card 133. The panel touch controller 122 is connected to the touch display panel 110, the timer 121, and the processor 132 in the image adjustment unit 130. The processor 132 is connected to the panel touch controller 122 and the display card 133. The display card 133 is connected to the touch display panel 110.

In operation, the display unit 111 displays images through the content display region, and the touch unit 112 detects a contact area pressed by an object and generates a touch signal according to the contact area. In step S210, when a user presses the touch display panel 110 with his/her fingers, the touch unit 112 detects the pressed contact area and generates a touch signal accordingly. In step S220, the touch display panel 110 sends the touch signal to the panel touch control unit 120, and the panel touch control unit 120 determines whether to send an adjustment signal according to the comparison result between the status value of the touch signal and a first predetermined value, wherein the status value of the touch signal may be the lasting time of the touch signal.

Step S220 further includes following steps. In step S221, the panel touch controller 122 triggers the timer 121 according to the touch signal received from the touch display panel 110. In step S222, the timer 121 starts working according to the touch signal to generate the lasting time of the touch signal, wherein the lasting time of the touch signal is the time during which the contact area is continuously pressed.

Then, in step S223, the panel touch controller 122 determines whether the lasting time of the touch signal is greater than a first predetermined value. If the lasting time is smaller than the first predetermined value (i.e., the user is working with a functional option on the touch display panel), step S224 is executed, wherein the panel touch controller 122 sends the touch signal to the processor 132 to execute a control command corresponding to the touch signal. On the other hand, if the lasting time is greater than the first predetermined value (i.e., the user is not working with any functional option on the touch display panel), step S225 is executed, wherein the panel touch controller 122 sends an adjustment signal.

Figure 3:
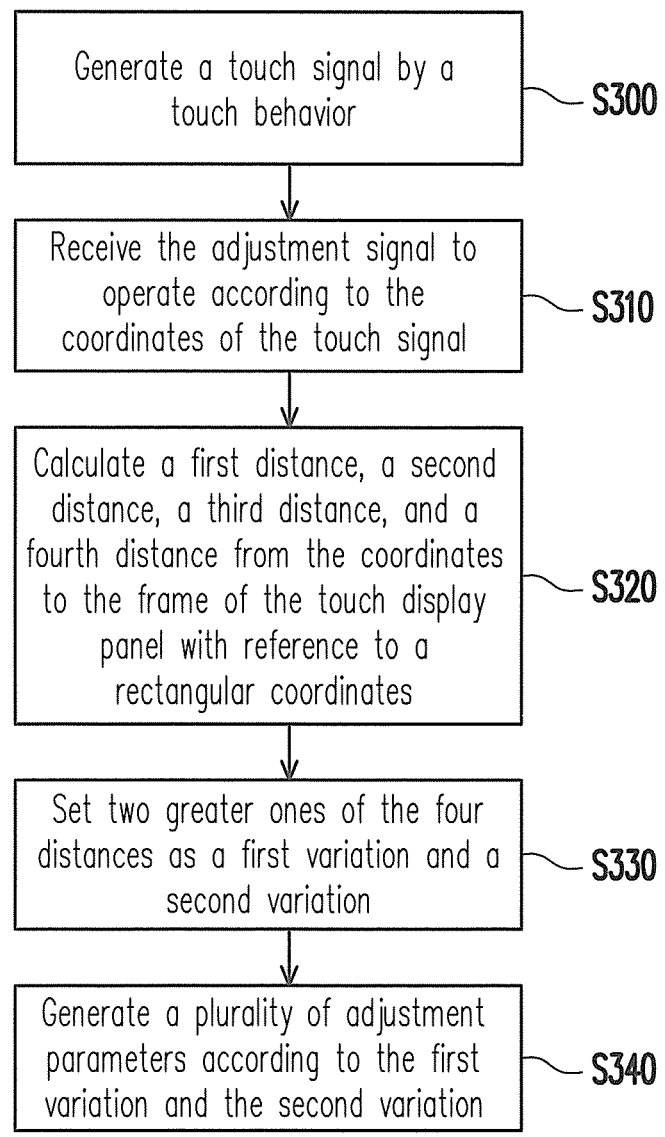
FIG. 3 is a detailed flowchart of step S230 in FIG. 2B.

Moreover, when the image adjustment unit 130 receives the adjustment signal, in step S230, the image adjustment unit 130 generates a plurality of adjustment parameters according to the coordinates of the contact area. FIG. 3 is a detailed flowchart of step S230 in FIG. 2B. Below, step S230 will be described in detail with reference to FIG. 1 and FIG. 3. In the step S300, the touch display panel generates a touch signal by a touch behavior. In step S310, when the panel touch control unit 120 receives the touch signal and generates and sends the adjustment signal and the image adjustment unit 130 receives the adjustment signal, the image adjustment unit 130 operates according to the coordinates of the touch signal, wherein the adjustment signal contains information of the touch signal. At the same time when the image adjustment unit 130 adjusts the size of the content display region on the touch display panel, the panel touch control unit 120 adjusts the size of the touch menu region by using the adjustment signal on the touch display panel.

Figure 4:
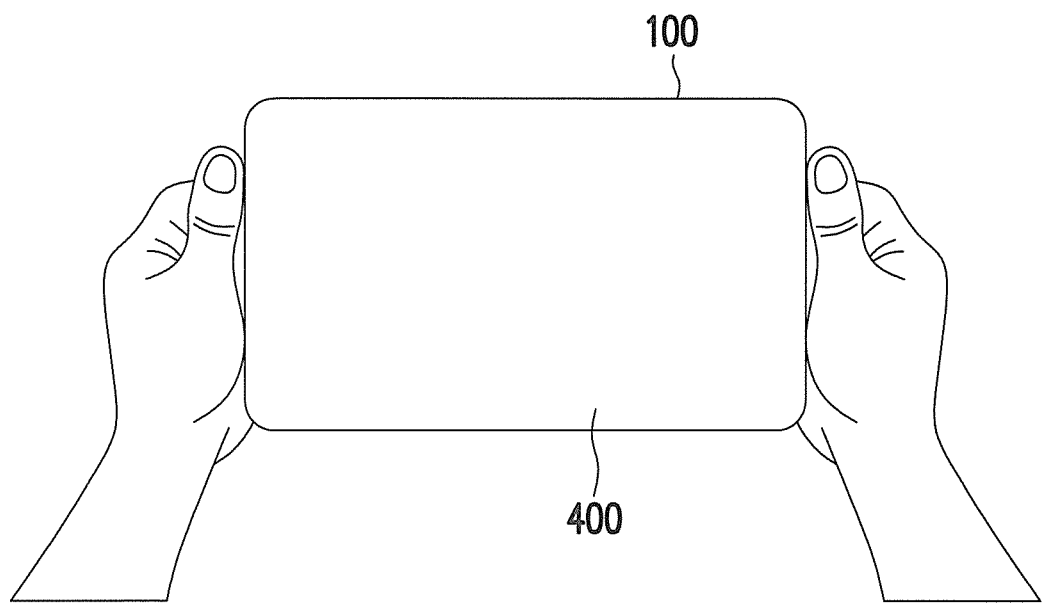
FIG. 4 and FIG. 5 are diagrams respectively illustrating a user holding an electronic device.
Figure 5:
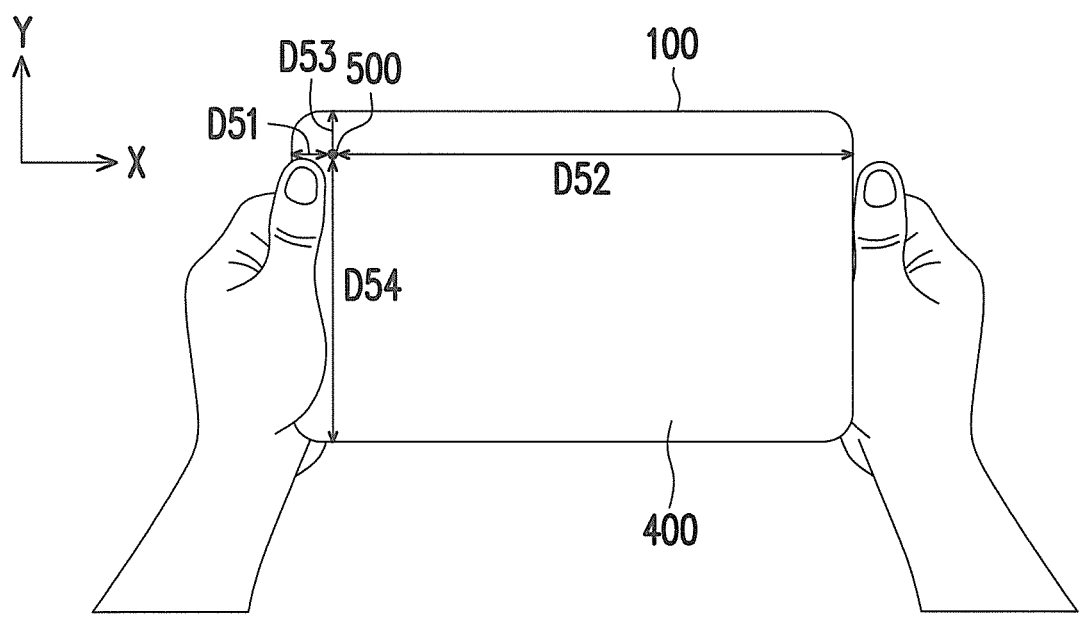

FIG. 4 and FIG. 5 are diagrams respectively illustrating a user holding an electronic device. As shown in FIG. 4, while holding the electronic device 100, the user can support the electronic device 100 with four fingers of each hand and put his/her thumbs at both sides of the touch display panel 110. In this case, none of the user's fingers presses the touch display panel 110. Thus, the content display region 400 and the touch menu region on the touch display panel 110 are expanded to their maximum sizes and a full-screen display is achieved. On the other hand, as shown in FIG. 5, while holding the electronic device 100, the user can support the electronic device 100 with four fingers of each hand and press the thumb on his/her left hand on the touch display panel 110 to form a contact area 500 and product a touch signal. In addition, because the user presses the contact area 500 for a long time, the panel touch control unit 120 sends an adjustment signal.

Regarding the coordinates of the touch signal, in step S320, the processor 132 calculates a first distance, a second distance, a third distance, and a fourth distance from the coordinates to the frame of the touch display panel 110 according to a rectangular coordinates. For example, as shown in FIG. 5, the processor 132 calculates distances D51 and D52 from the coordinates of the contact area 500 to the frame of the touch display panel 110 along a direction parallel to the axis X. Besides, the processor 132 also calculates distances D53 and D54 from the coordinates of the contact area 500 to the frame of the touch display panel 110 along a direction parallel to the axis Y. In other words, the processor 132 can obtain four distances D51-D54 related to the coordinates of the contact area 500.

Regarding the four distances, in step S330, the processor 132 sets two greater ones of the four distances as a first variation and a second variation. In step S340, the display card 133 generates a plurality of adjustment parameters according to the first variation and the second variation. For example, as shown in FIG. 5, because the distances D52 and D54 are two greater ones among the four distances D51-D54, the processor 132 sets the distances D52 and D54 respectively as a first variation and a second variation. Besides, the display card 133 generates a plurality of adjustment parameters according to the first variation D52 and the second variation D54.

With different product design, when the timer 121 has functions of timing and triggering functions, the timer 121 can send an adjustment signal to the panel touch controller 122 in the condition of the pressing time exceeding the first predetermined value. The panel touch controller 122 can then replace the processor 132 to calculate the first, second, third, and fourth distances from the coordinates of the contact area 500 to the frame of the touch display panel 110 with reference to a rectangular coordinates, set the first variation and the second variation among the four distances, and send the first variation and the second variation to the display card 133 through the processor 132.

Referring to FIG. 1 and FIG. 2B again, in step S240, the touch display panel 110 adjusts the size of the content display region according to the adjustment parameters generated by the image adjustment unit 130 and continuously displays images in the content display region. Meanwhile, the panel touch control unit 120 adjusts the size of the touch menu region according to the adjustment signal or the adjustment parameters. In step S250, after the content display region on the touch display panel is adjusted, the image adjustment unit 130 keeps detecting whether any adjustment signal is received.

When the adjustment signal disappears or the disappearing time of the adjustment signal exceeds a second predetermined value, the image adjustment unit 130 restores the content display region on the touch display panel 110 to its original state, wherein the original state includes the original size and the original position, and the second predetermined value is a time predetermined value. When the image adjustment unit 130 receives a new touch signal, the touch signal contains new coordinates, and the status value of the touch signal is greater than the first predetermined value, the image adjustment unit 130 adjusts the size of the content display region on the touch display panel according to the new touch signal. When the image adjustment unit 130 continuously detects whether any adjustment signal is received, the panel touch control unit 120 also continuously detects whether the adjustment signal is generated. When the adjustment signal is generated, the panel touch control unit 120 adjusts the size of the touch menu region according to the adjustment signal or adjustment parameters along with the adjustment of the content display region.

Figure 6:
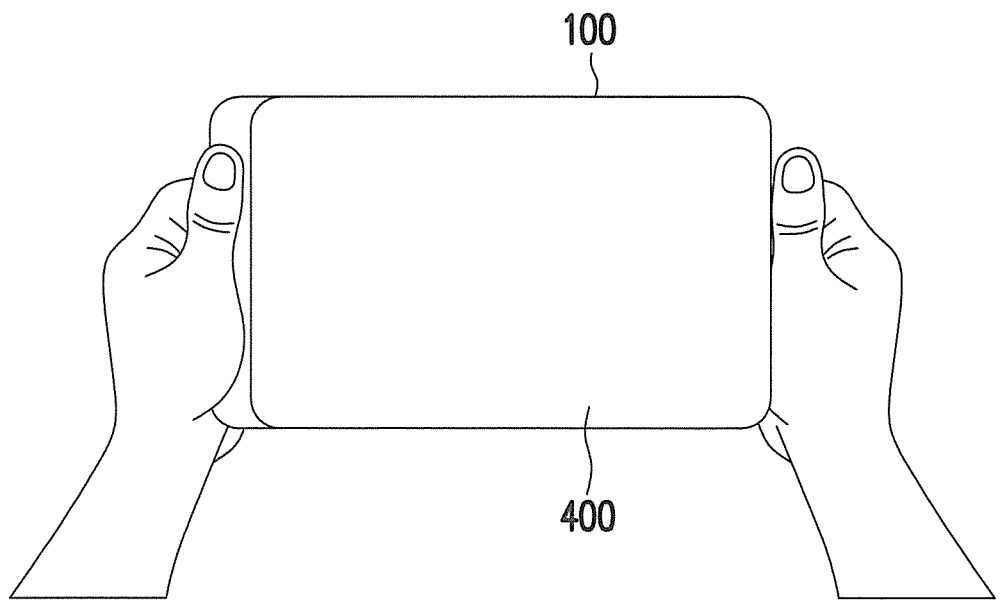
FIGS. 6-8 are diagrams respectively illustrating changes of a display region of an electronic device.
Figure 7:
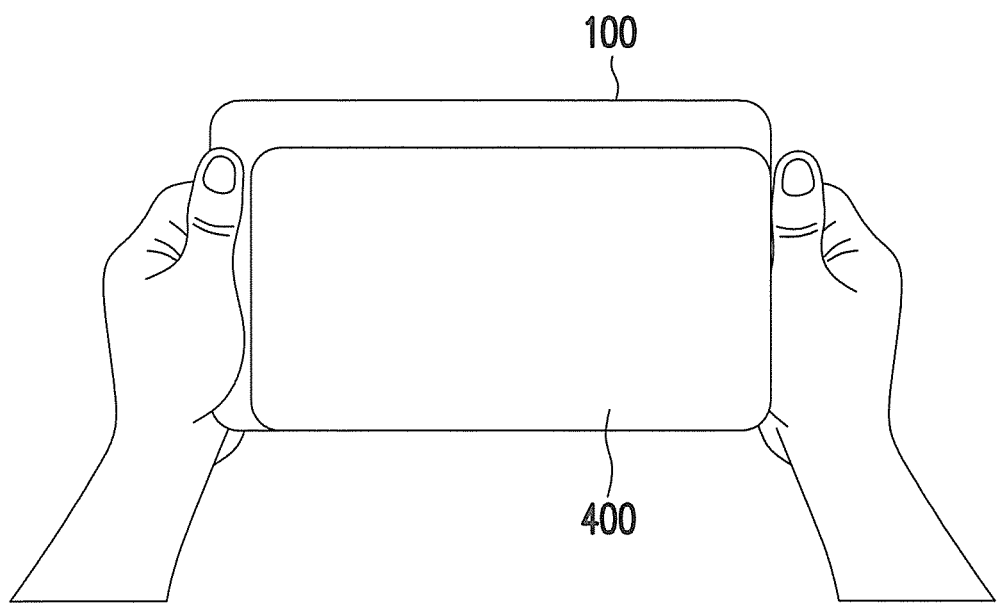
Figure 8:
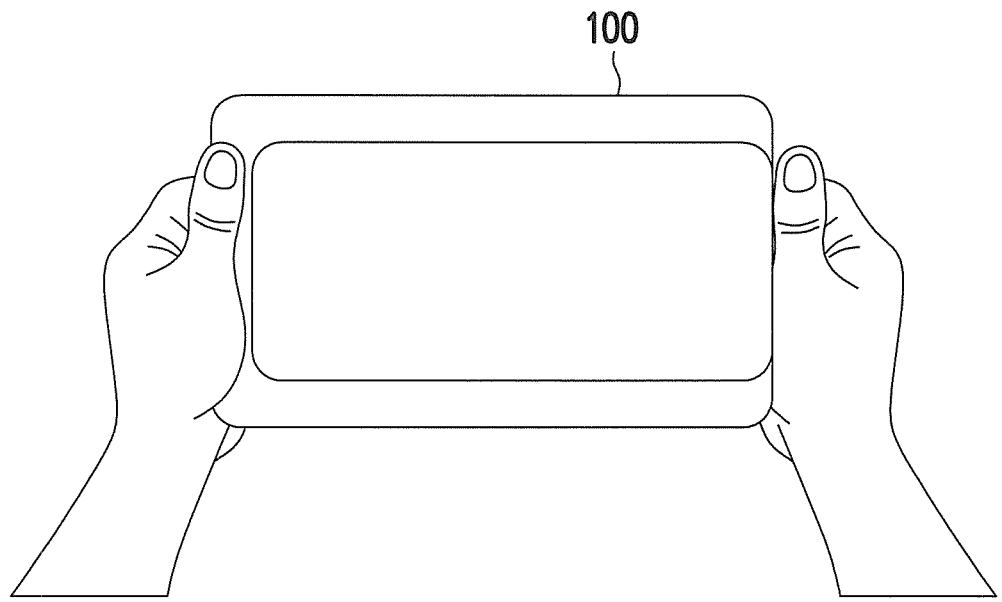

FIGS. 6-8 are diagrams respectively illustrating the changes of a content display region and a touch menu region of an electronic device. As shown in FIG. 6, in an embodiment, the touch display panel 110 shifts the left side of the content display region 400 inwards according to the adjustment parameters and changes the resolution of the content display region according to the actual requirement. In addition, the length of the adjusted content display region 400 is equal to the distance D52, and the width thereof is not changed.

Moreover, as shown in FIG. 7, in another embodiment, the touch display panel 110 shifts both the left and upper sides of the content display region 400 inwards according to the adjustment parameters. The length of the adjusted content display region 400 is equal to the distance D52, and the width thereof is equal to the distance D54. Furthermore, as shown in FIG. 8, in yet another embodiment, the touch display panel 110 shifts the left, upper, and lower sides of the content display region 400 inwards according to the adjustment parameters. The length of the adjusted content display region 400 is equal to the distance D52, and the width thereof is smaller than the distance D54.

With different product design, when the first variation and the second variation are generated by the image adjustment unit 130, the first variation and the second variation are sent back to the panel touch control unit 120 to adjust the size of the touch menu region on the touch display panel 110. The first variation and the second variation may also be generated by the panel touch control unit 120 according to the adjustment signal and then send to the image adjustment unit 130 to be processed. With different user requirement, the panel touch control unit 120 may control the touch menu region on the touch display panel 110 so that the touch menu region is reduced or enlarged along with the content display region 400. With different product requirement, the adjusted content display region and the adjusted touch menu region may have different sizes, and accordingly, the content display region and the touch menu region may not overlap each other or may partially overlap each other. When the content display region is adjusted, the resolution of the content display region may or may not be adjusted according to the user's requirement. When the resolution of the content display region is not adjusted, the position of the content display region on the electronic device is adjusted.

Figure 9:
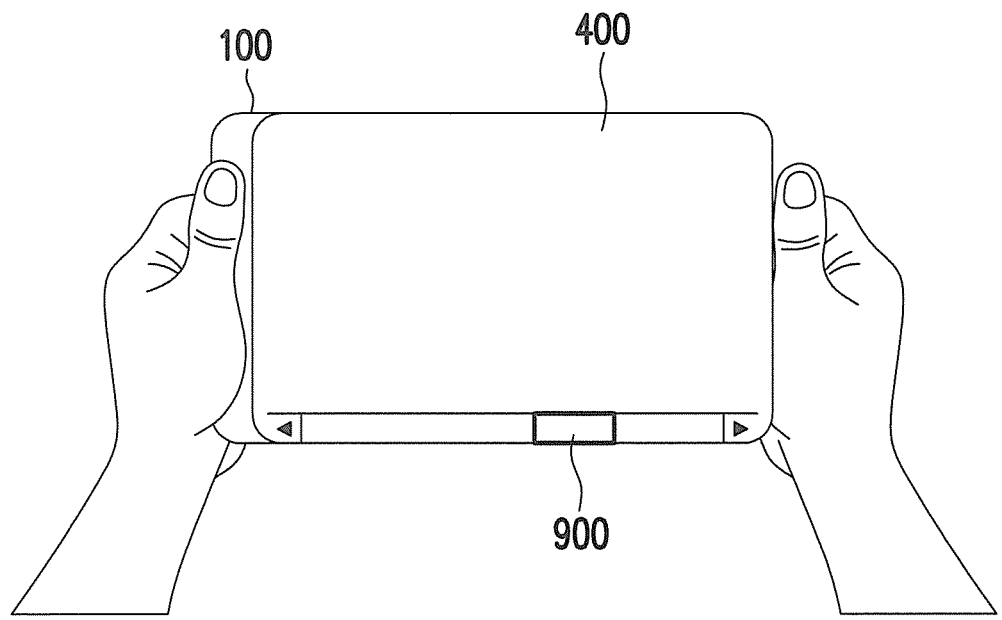
FIG. 9 is another diagram illustrating the change of a display region of an electronic device.

Referring to FIG. 1 and FIG. 2B again, the electronic device 100 presents a drag list within the adjusted content display region to assist the user to browse images. FIG. 9 is another diagram illustrating the change of a content display region of an electronic device. As shown in FIG. 9, the left side of the content display region 400 is shifted inwards but the resolution of the content display region is not adjusted. Thus, a drag list 900 is presented within the content display region 400 such that the user can view and select commands or contents originally not shown in the adjusted content display region.

Figure 10:
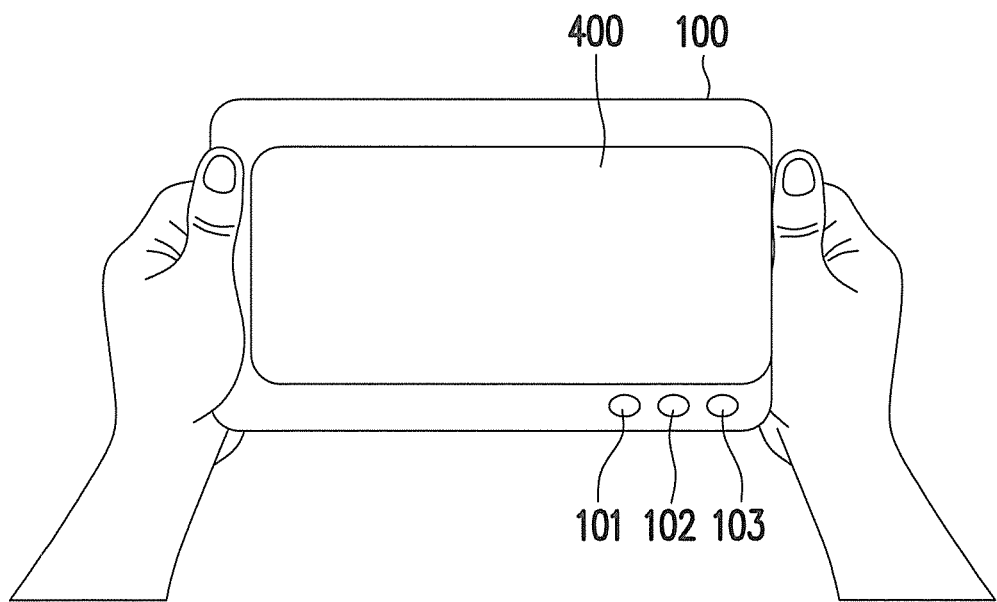
FIG. 10 is yet another diagram illustrating the change of a display region of an electronic device.

Additionally, the image adjustment unit 130 may also present a control menu within the part of the touch menu region that is not overlapped with the content display region, so as to allow the user to control the content of the content display region, wherein the control menu may be a drag list or a plurality of keys, and the control menu presents a transparent or semi-transparent pattern. FIG. 10 is yet another diagram illustrating the change of a content display region of an electronic device. As shown in FIG. 10, along with the inward shift of the left, upper, and lower sides of the content display region 400, the panel touch control unit 120 further presents a control menu at the bottom of the touch display panel 110 and in the non-overlapped area between the touch menu region and the content display region according to the adjustment parameters. Herein a plurality of keys 101-103 is displayed within the touch menu region and the non-overlapped area where the touch menu region and the content display region to assist the user's operations within the content display region of the electronic device 100.

Figure 11:
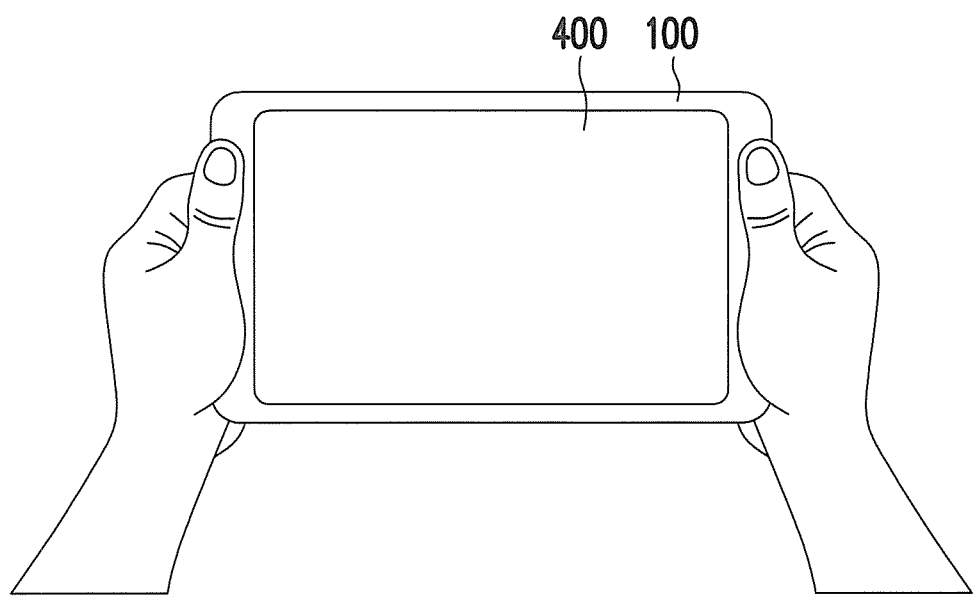
FIG. 11 is still another diagram illustrating the change of a content display region of an electronic device.

FIG. 11 is still another diagram illustrating the change of a content display region of an electronic device. As shown in FIG. 11, when the user presses both his/her thumbs on the touch display panel 110 to produce a first contact area and a second contact area, the panel touch control unit 120 first receives a first touch signal and then a second touch signal, wherein the first touch signal is a touch signal generated when the user's left (right) hand touches the touch display panel 110, and the second touch signal is a touch signal generated when the user's right (left) hand touches the touch display panel 110. The first contact area contains the coordinates of the first touch signal, and the second contact area contains the coordinates of the second touch signal.

After the panel touch control unit 120 receives the first touch signal, it generates a first adjustment signal. The panel touch control unit 120 adjusts the size of the touch menu region according to the first adjustment signal to obtain a first touch menu region, and the image adjustment unit 130 adjusts the size of the content display region according to the first adjustment signal to obtain a first content display region. When the panel touch control unit 120 receives the second touch signal, it generates a second adjustment signal according to the second touch signal. The panel touch control unit 120 adjusts the size of the touch menu region according to the second adjustment signal to obtain a second touch menu region, and the image adjustment unit 130 adjusts the size of the content display region according to the second adjustment signal to obtain a second content display region.

When the panel touch control unit 120 receives the first touch signal and the second touch signal at the same time, the panel touch control unit 120 adjusts the size of the touch menu region according to both the first adjustment signal and the second adjustment signal to obtain a third touch menu region, and the image adjustment unit 130 adjusts the size of the content display region according to both the first adjustment signal and the second adjustment signal to obtain a third content display region, wherein the third touch menu region may be an overlapped or partially overlapped area between the first touch menu region and the second touch menu region, and the third content display region may be an overlapped or partially overlapped area between the first content display region and the second content display region.

As shown in FIG. 11, when the user presses both his/her thumbs on the touch display panel 110, both the left and the right side of the content display region 400 are shifted inwards. Additionally, as shown in FIG. 11, the upper and lower side of the content display region 400 are also shifted inwards. However, regarding the setting of the content display region 400, the electronic device 100 may also selectively adjust the upper and lower sides of the content display region 400 according to the user requirement. When any touch signal disappears, the touch menu region and the content display region are adjusted according to the adjustment signal generated by the panel touch control unit 120 according to the touch signal it still receives.

Additionally, the electronic device 100 further includes a second storage unit 140, a lock key 150, and an input controller 160. The second storage unit 140 is electrically connected to the processor 132 and executes corresponding data storage operations by cooperating with the processor 132. The second storage unit 140 may be a hard disc or a flash memory. The input controller 160 is electrically connected to the lock key 150 and the processor 132 in the image adjustment unit 130. The lock key 150 may be a physical key or a virtual key.

In operation, when the lock key 150 is pressed, the lock key 150 generates an input signal, and the input controller 160 generates a locking signal according to the input signal. The image adjustment unit 130 latches the adjustment parameters according to the locking signal to lock the range of the content display region. In other words, when the user thinks the content display region has reached an optimal size, the user can lock the content display region by pressing the lock key 150, so that the range of the content display region won't change with different holding gestures over the electronic device 100 of the user.

It should be mentioned that when the user accidentally touches the touch display panel 110 due to his/her holding gesture, the contact area produced herein is larger than the contact area produced when the user clicks on the touch display panel 110. In other words, besides the lasting time of the touch signal, whether the user accidentally touches the touch display panel 110 may also be determined according to the size of the contact area pressed by the user.

Figure 12:
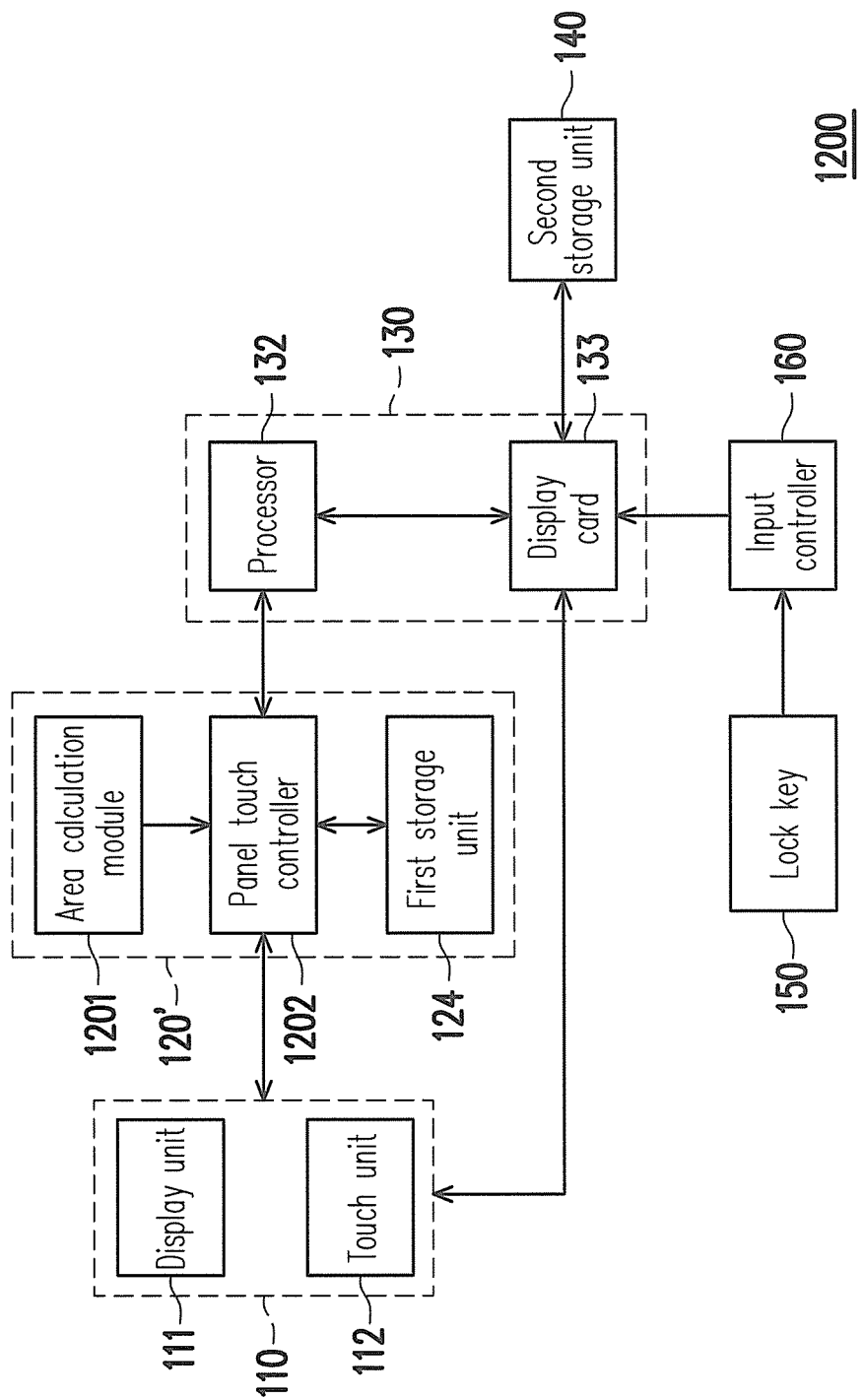
FIG. 12 is a block diagram of an electronic device according to another embodiment of the invention.

FIG. 12 is a block diagram of an electronic device according to another embodiment of the invention. The major difference between the embodiment illustrated in FIG. 12 and the embodiment illustrated in FIG. 1 is that in the embodiment illustrated in FIG. 1, the electronic device 100 determines whether to execute the control command corresponding to the touch signal according to the lasting time of the touch signal, while in the embodiment illustrated in FIG. 12, the electronic device 1200 determines whether to execute the control command corresponding to the touch signal according to the size of the contact area. Thus, the panel touch control unit 120' in the embodiment illustrated in FIG. 12 is different from the panel touch control unit 120 in the embodiment illustrated in FIG. 1.

To be specific, in the embodiment illustrated in FIG. 12, the panel touch control unit 120' includes an area calculation module 1201 and a panel touch controller 1202. In operation, the area calculation module 1201 detects and calculates the size of the contact area and generates a contact area value. In addition, the panel touch controller 1202 determines whether the contact area value is greater than a third predetermined value. When the contact area value is greater than the third predetermined value (i.e., the user is not working with any functional option on the touch display panel), the panel touch controller 1202 sends an adjustment signal. Contrarily, when the contact area value is smaller than the third predetermined value, the panel touch controller 1202 executes the control command corresponding to the touch signal. The operations of other components in the embodiment illustrated in FIG. 12 have been described in foregoing embodiments therefore will not be described herein.

Figure 13:
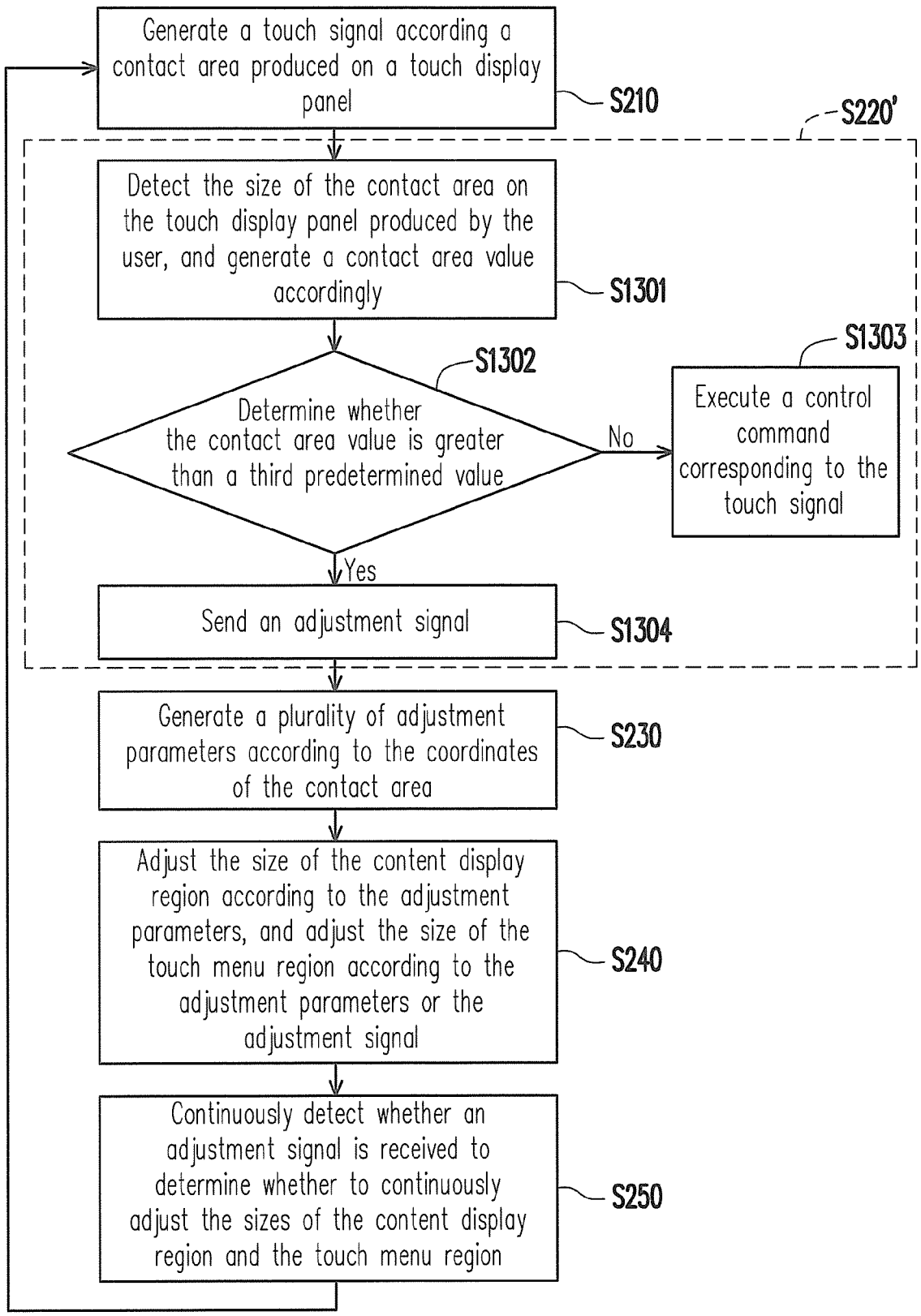
FIG. 13 is a flowchart of an operation method of an electronic device according to another embodiment of the invention.

FIG. 13 is a flowchart of an operation method of an electronic device according to another embodiment of the invention. The major difference between the embodiment illustrated in FIG. 13 and the embodiment illustrated in FIG. 2B is that in step S220 of the embodiment illustrated in FIG. 2B, whether to execute the control command corresponding to the touch signal is determined according to the lasting time of the touch signal, while in step S220' of the embodiment illustrated in FIG. 13, whether to execute the control command corresponding to the touch signal is determined according to the size of the contact area.

To be specific, step S220' of the embodiment illustrated in FIG. 13 further includes following steps. First, in step S1301, the contact area produced when the user presses the touch display panel is detected and a contact area value is generated. Then, in step S1302, whether the contact area value is greater than the third predetermined value is determined. When the contact area value is greater than the third predetermined value (i.e., the user is not working with any functional option on the touch display panel), step S1304 is executed, wherein the panel touch control unit 120 sends an adjustment signal. Contrarily, when the contact area value is smaller than the third predetermined value, step S1303 is executed, wherein the control command corresponding to the touch signal is executed. Other steps of the embodiment illustrated in FIG. 13 have been described in foregoing embodiments therefore will not be described herein.

In summary, in the invention, whether the panel touch control unit sends an adjustment signal is determined according to the lasting time of the touch signal or the size of the contact area produced when the user presses the touch display panel. Additionally, in the invention, when the panel touch control unit sends an adjustment signal, the ranges of the content display region and the touch menu region are adjusted according to the coordinates of the touch signal. Thus, when the user is not working with any functional option on the touch display panel, the electronic device does not execute any control command. Instead, the electronic device adjusts the ranges of the content display region and the touch menu region on the touch display panel. Thereby, while browsing an image, the electronic device does not leave the browsed image even if the user puts his/her fingers on the touch display panel in order to hold the electronic device more comfortably. Instead, the electronic device adjusts the ranges of the content display region and the touch menu region correspondingly.

It will be apparent to those skilled in the art that various modifications and variations can be made to the structure of the invention without departing from the scope or spirit of the invention. In view of the foregoing, it is intended that the invention cover modifications and variations of this invention provided they fall within the scope of the following claims and their equivalents.

What is claimed is:

1. An electronic device, comprising:
   a touch display panel, having a content display region and a touch menu region with different sizes;
   a panel touch control unit, connected to the touch display panel, generating a first adjustment signal according to a received first touch signal to adjust the size of the touch menu region on the touch display panel; and
   an image adjustment unit, adjusting the size of the content display region on the touch display panel according to the first adjustment signal;
   wherein a frame of the touch display is composed of two first sides and two second sides, the first sides are perpendicular to the second sides, the image adjustment unit calculates a first distance and a second distance from the first touch signal to the first sides of the frame, calculates a third distance and a fourth distance from the first touch signal to the second sides of the frame, sets a greater one of the first distance and the second distance as a first variation, sets a greater one of the third distance and the fourth distance as a second variation, and adjusts the size of the content display region by using the first variation and the second variation.

2. The electronic device according to claim 1, wherein the touch display panel is a multi-touch display panel.

3. The electronic device according to claim 2, wherein the panel touch control unit generates a second adjustment signal according to a received second touch signal and adjusts the size of the touch menu region according to the second adjustment signal on the touch display panel, and the image adjustment unit adjusts the size of the content display region according to the second adjustment signal on the touch display panel.

4. The electronic device according to claim 3, wherein when the panel touch control unit receives both the first touch signal and the second touch signal, the panel touch control unit adjusts the size of the touch menu region according to the first adjustment signal and the second adjustment signal on the touch display panel, and the image adjustment unit adjusts the size of the content display region according to the first adjustment signal and the second adjustment signal on the touch display panel.

5. The electronic device according to claim 4, wherein the size of the adjusted content display region according to the first adjustment signal and the second adjustment signal is an overlapped area or a partially overlapped area between the size of the adjusted content display region according to the first adjustment signal and the size of the adjusted content display region according to the second adjustment signal.

6. The electronic device according to claim 4, wherein the size of the adjusted touch menu region according to the first adjustment signal and the second adjustment signal is an overlapped area or a partially overlapped area between the size of the adjusted touch menu region according to the first adjustment signal and the size of the adjusted touch menu region according to the second adjustment signal.

7. The electronic device according to claim 1, wherein the touch display panel comprises a display unit and a touch unit, the display unit displays an image, and the touch unit generates the first touch signal.

8. The electronic device according to claim 1, wherein the panel touch control unit comprises a panel touch controller, the panel touch controller adjusts the size of the touch menu region according to the first touch signal, and the first adjustment signal comprises information of the first touch signal.

9. The electronic device according to claim 1, wherein the panel touch control unit further comprises a timer, and the timer calculates a lasting time of the first touch signal, wherein when the lasting time of the first touch signal is greater than a predetermined value, the panel touch control unit sends the first adjustment signal, and when the lasting time of the first touch signal is smaller than the predetermined value, the panel touch control unit executes a control command corresponding to the first touch signal.

10. The electronic device according to claim 1, wherein the panel touch control unit further comprises an area calculation module, and the area calculation module calculates a contact area produced by the first touch signal within the touch menu region, wherein when the contact area is greater than a predetermined value, the panel touch control unit sends the first adjustment signal, and when the contact area is smaller than the predetermined value, the panel touch control unit executes a control command corresponding to the first touch signal.

11. The electronic device according to claim 1, wherein the image adjustment unit comprises a processor and a display card.

12. The electronic device according to claim 1, wherein the panel touch control unit further comprises a storage unit.

13. The electronic device according to claim 1 further comprising:
a lock key, wherein after the lock key is pressed, a range of the content display region is locked so that the range of the content display region is not adjusted in response to the first variation and the second variation.

14. The electronic device according to claim 1, wherein the panel touch control unit and the image adjustment unit further generate a drag list within the content display region.

15. The electronic device according to claim 1, wherein the content display region and the touch menu region do not overlap each other or partially overlap each other.

16. The electronic device according to claim 15, wherein data of the content display region located within an overlapped portion between the touch menu region and the content display region presents a transparent or semi-transparent pattern.

17. The electronic device according to claim 15, wherein touch signals of the touch menu region generated within an overlapped portion and a non-overlapped portion between the touch menu region and the content display region are simultaneously processed.

18. The electronic device according to claim 15, wherein the image adjustment unit further presents a control menu within a non-overlapped area between the content display region and the touch menu region, and the control menu is within the touch menu region.

19. The electronic device according to claim 18, wherein the control menu comprises a plurality of keys or a drag list.

20. The electronic device according to claim 18, wherein the control menu presents a transparent or semi-transparent pattern.

21. The electronic device according to claim 1, wherein the content display region and the touch menu region simultaneously process the first adjustment signal.

22. The electronic device according to claim 1, wherein the content display region is a visible area of a data display region, and the touch menu region is an area on the touch display panel which is touched to control the electronic device.

23. The electronic device according to claim 1, wherein a resolution of the adjusted content display region changes or does not change.

24. The electronic device according to claim 23, wherein when the resolution of the content display region does not change, a position of the content display region on the electronic device changes.

25. An operation method of an electronic device having a touch display panel that includes an adjustable content display region and an adjustable touch menu region, comprising:
generating a first touch signal by a first touch behavior;
receiving the first touch signal by using a panel touch control unit;
generating and sending a first adjustment signal to an image adjustment unit by using the panel touch control unit according to the first touch signal; and
adjusting a size of the content display region on the touch display panel according to the first adjustment signal by using an image adjustment unit and adjusting a size of the touch menu region on the touch display panel according to the first adjustment signal by using the panel touch control unit;
wherein a frame of the touch display is composed of two first sides and two second sides, the first sides are perpendicular to the second sides, the step of adjusting the size of the content display region according to the first adjustment signal by using the image adjustment unit comprises: calculating a first distance and a second distance from the first touch signal to the first sides of the frame, calculating a third distance and a fourth distance from the first touch signal to the seconds sides of the frame, setting a greater one of the first distance and the second distance as a first variation, setting a greater one of the third distance and the fourth distance as a second variation, and adjusting the size of the content display region by using the first variation and the second variation.

26. The operation method according to claim 25, wherein the touch display panel comprises a display unit and a touch unit, the display unit displays an image, and the touch unit generates the first touch signal.

27. The operation method according to claim 25, wherein the step of sending the first adjustment signal comprises:
  calculating a lasting time of the first touch signal by using a timer of the panel touch control unit;
  when the lasting time of the first touch signal is greater than a predetermined value, sending the first adjustment signal by using the panel touch control unit; and
  when the lasting time of the first touch signal is shorter than the predetermined value, executing a control command corresponding to the first touch signal by using the panel touch control unit.

28. The operation method according to claim 25, wherein the step of sending the first adjustment signal comprises:
  calculating a contact area produced by the first touch signal within the touch menu region by using an area calculation module in the panel touch control unit;
  when the contact area is greater than a predetermined value, sending the first adjustment signal by using the panel touch control unit; and
  when the contact area is smaller than the predetermined value, executing a control command corresponding to the first touch signal by using the panel touch control unit.

29. The operation method according to claim 25, further comprises:
  after a lock key is pressed, locking a range of the content display region so that the range of the content display region is not adjusted in response to the first variation and the second variation.

30. The operation method according to claim 25, wherein the content display region and the touch menu region do not overlap each other or partially overlap each other.

31. The operation method according to claim 30, wherein data of the content display region located within an overlapped portion between the touch menu region and the content display region presents a transparent or semi-transparent pattern.

32. The operation method according to claim 30, wherein first touch signals of the touch menu region generated within an overlapped portion and a non-overlapped portion between the touch menu region and the content display region are simultaneously processed.

33. The operation method according to claim 30, wherein the image adjustment unit further presents a control menu within a non-overlapped area between the content display region and the touch menu region, and the control menu is within the touch menu region.

34. The operation method according to claim 33, wherein the control menu comprises a plurality of keys or a drag list.

35. The operation method according to claim 33, wherein the control menu presents a transparent or semi-transparent pattern.

36. The operation method according to claim 25, wherein the touch display panel is a multi-touch display panel and generates a second touch signal by a second touch behavior, and the panel touch control unit generates a second adjustment signal according to the second touch signal.

37. The operation method according to claim 36, wherein after the panel touch control unit generates the second adjustment signal, the panel touch control unit adjusts the size of the touch menu region according to the second adjustment signal on the touch display panel, and the image adjustment unit adjusts the size of the content display region according to the second adjustment signal on the touch display panel.

38. The operation method according to claim 37, wherein when the panel touch control unit receives both the first touch signal and the second touch signal, the panel touch control unit adjusts the size of the touch menu region according to the first adjustment signal and the second adjustment signal on the touch display panel, and the image adjustment unit adjusts the size of the content display region according to the first adjustment signal and the second adjustment signal on the touch display panel.

39. The operation method according to claim 38, wherein the size of the adjusted content display region according to the first adjustment signal and the second adjustment signal is an overlapped area or a partially overlapped area between the size of the adjusted content display region according to the first adjustment signal and the size of the adjusted content display region according to the second adjustment signal.

40. The operation method according to claim 38, wherein the size of the adjusted touch menu region according to the first adjustment signal and the second adjustment signal is an overlapped area or a partially overlapped area between the size of the adjusted touch menu region according to the first adjustment signal and the size of the adjusted touch menu region according to the second adjustment signal.

* * * * *